United States Patent [19]

Hiramatsu et al.

[11] Patent Number: 5,313,690
[45] Date of Patent: May 24, 1994

[54] BUCKLE PRETENSIONER FOR SEAT BELT SYSTEMS

[75] Inventors: Koji Hiramatsu; Ryoichi Yoshida, both of Shiga, Japan

[73] Assignee: Takata Corporation, Tokyo, Japan

[21] Appl. No.: 76,353

[22] Filed: Jun. 14, 1993

[30] Foreign Application Priority Data

Jun. 16, 1992 [JP] Japan ................... 4-180518

[51] Int. Cl.⁵ .............................. A44B 11/00
[52] U.S. Cl. ........................ 24/641; 24/603; 24/633
[58] Field of Search ............ 24/641, 633, 603, 602, 24/468, 463, 455, 303; 297/468

[56] References Cited

U.S. PATENT DOCUMENTS

| | | | |
|---|---|---|---|
| 3,142,102 | 7/1964 | Saunders | 24/602 |
| 3,146,846 | 9/1964 | Gutshall | 24/603 |
| 4,644,616 | 2/1987 | Ferry | 24/603 |
| 5,097,571 | 3/1992 | Fohl | 24/641 |

FOREIGN PATENT DOCUMENTS

1-119455  5/1989  Japan.
1-164651  6/1989  Japan.
2-256550 10/1990  Japan.

Primary Examiner—Victor N. Sakran
Attorney, Agent, or Firm—Brumbaugh, Graves, Donohue & Raymond

[57] ABSTRACT

A buckle pretensioner for a seat belt system includes a support member on which a buckle is mounted for movement generally downwardly from a normal upper position to a pretensioning lower position in which pretension is applied to the seat belt. A rotary actuator mounted on the support member and supplied with gas from a gas generator provides a driving force for moving the buckle downwardly along the support member. A connecting mechanism, which includes a force-transmitting mechanism that transduces a tangential force produced by rotation of the rotor of the rotary actuator to a translational force, connects the rotary actuator to the buckle for transmitting the driving force from the rotary actuator to the buckle. A locking device locks the buckle in the lower position to which it is driven by the driving force.

1 Claim, 7 Drawing Sheets

BUCKLE PRETENSIONER FOR SEAT BELT SYSTEMS

BACKGROUND OF THE INVENTION

The present invention relates to vehicle seat belt systems and, in particular, to a pretensioner that tightens a vehicle seat belt by pulling a buckle to which the belt is attached generally downwardly from a normal upper position to a pretensioning lower position.

The seat belt systems of vehicles, such as automobiles, are often equipped with pretensioners for applying pretension to the belts when an acceleration greater than a predetermined threshold level is applied to the vehicle, such as may occur in a collision. The pretension applied to the belt tightens the belt against the occupant before he or she is thrown forward by inertial force and provides enhanced restraint of the occupant by the belt. Various types of pretensioners are well known and in common use. One general type, which is known in several specific forms, is a buckle pretensioner, which provides pretension by pulling generally downwardly on a buckle to which the belt is attached. Such belt pretensioners, when they are provided, are almost always located on the side of a seat and operate to pull down a buckle that receives a buckle tongue at the juncture between the shoulder and lap portions of a belt in a three-point belt system. In such an arrangement, pretension is applied generally equally to both the lap and shoulder portions of the belt.

Among the specific types of previously known buckle pretensioners are those that have as the drive device a piston/cylinder operated by gas pressure (see, for example, Japanese Patent Laid-open Publication No. 1-119455), or a compression coil spring mechanism (Japanese Patent Laid-open Publication No. 2-256550). In those types, the piston/cylinder or the spring mechanism, as the case may be, is connected to the buckle by a flexible drive cable, which passes over a guide roller or surface. The drive device has an operating axis that is at a sharp angle to the path of movement of the buckle, because it is necessary to have the drive device extend generally horizontally along the side of the seat. The size and position of the drive device place restrictions on the layout of the vehicle, such as the size and location of the housing of a gear shift mechanism between the seats.

Another type of previously known buckle pretensioner has as the drive device a spiral spring (Japanese Patent Laid-open Publication No. 1-164651). One end of the spiral spring is attached to the buckle support, and the other end engages and operates a clamp lever mechanism through a force-transmitting mechanism. The rotational force of the spring is converted from a rotational force to a linear or nearly linear force. An arrangement of this type places less restriction on the vehicle design than do the types that use piston/cylinders or compression springs, but the force-transmission mechanism is more complicated and has higher transmission losses.

SUMMARY OF THE INVENTION

One object of the present invention is to provide a buckle pretensioner for vehicle seat belt systems that is of a size and can be positioned such that it is less obtrusive and places minimal restrictions on the design of the vehicle. Another object is to provide a buckle pretensioner in which the power of the driving device is used more efficiently than in previously known buckle pretensioners.

The foregoing objects are attained, in accordance with the present invention, by a buckle pretensioner for a seat belt system having a support member on which a buckle is mounted for movement generally downwardly from a normal upper position to a pretensioning lower position, a drive device mounted on the support member for generating a driving force to move the buckle along the support member, a connecting device connecting the drive device to the buckle for transmitting the driving force from the drive device to the buckle, and a locking device for locking the buckle in the lower position to which it is driven by the driving force. The invention is characterized in that the drive device includes a rotary actuator having a rotor and a gas generator for supplying operating gas to the rotary actuator, and the connecting device is a force-transmitting mechanism that transduces a tangential force produced by rotation of the rotor to a translational force for moving the buckle from the upper position to the lower position.

In a pretensioner embodying the present invention, the rotary actuator is rotated by gas pressure supplied by the gas generator, and the rotational driving force is transduced by the force-transmitting mechanism into a translational force, which pulls the buckle generally downwardly from its normal upper position to the lower position. In this regard, the tangential component of the driving force output of the rotary actuator is converted completely to a translational driving force that acts on the buckle in the direction in which the buckle moves. Accordingly, the loss of power of the driving force is minimized. The movement of the buckle to the lower position causes the buckle tongue to which the seat belt is attached also to move down, thereby applying pretension to the belt. When the occupant is thrown forward by inertial force after the belt is pretensioned, the belt tension is maintained by the locking of the buckle in the lower position by the locking device.

A pretensioner, according to the present invention, is of a size, both radially and axially with respect to the axis of rotation of the rotary actuator, such that it can be installed on the side of a vehicle seat without imposing significant restrictions on the design of nearby vehicle components. In this regard, the drive and transmission devices are located generally below the buckle, in line with the path along which the buckle moves when the pretensioner operates. The efficiency of transmission of the force output of the rotary actuator contributes to the small size of the pretensioner, in that the size of the rotary actuator is minimized for any desired driving force because the transmission losses are small and the actuator does not have to have excess power to offset the losses.

For a better understanding of the invention, reference may be made to the following description of exemplary embodiments, taken in conjunction with the accompanying drawings.

DETAILED DESCRIPTION OF THE PREFERRED EMBODIMENTS

Figure 1:
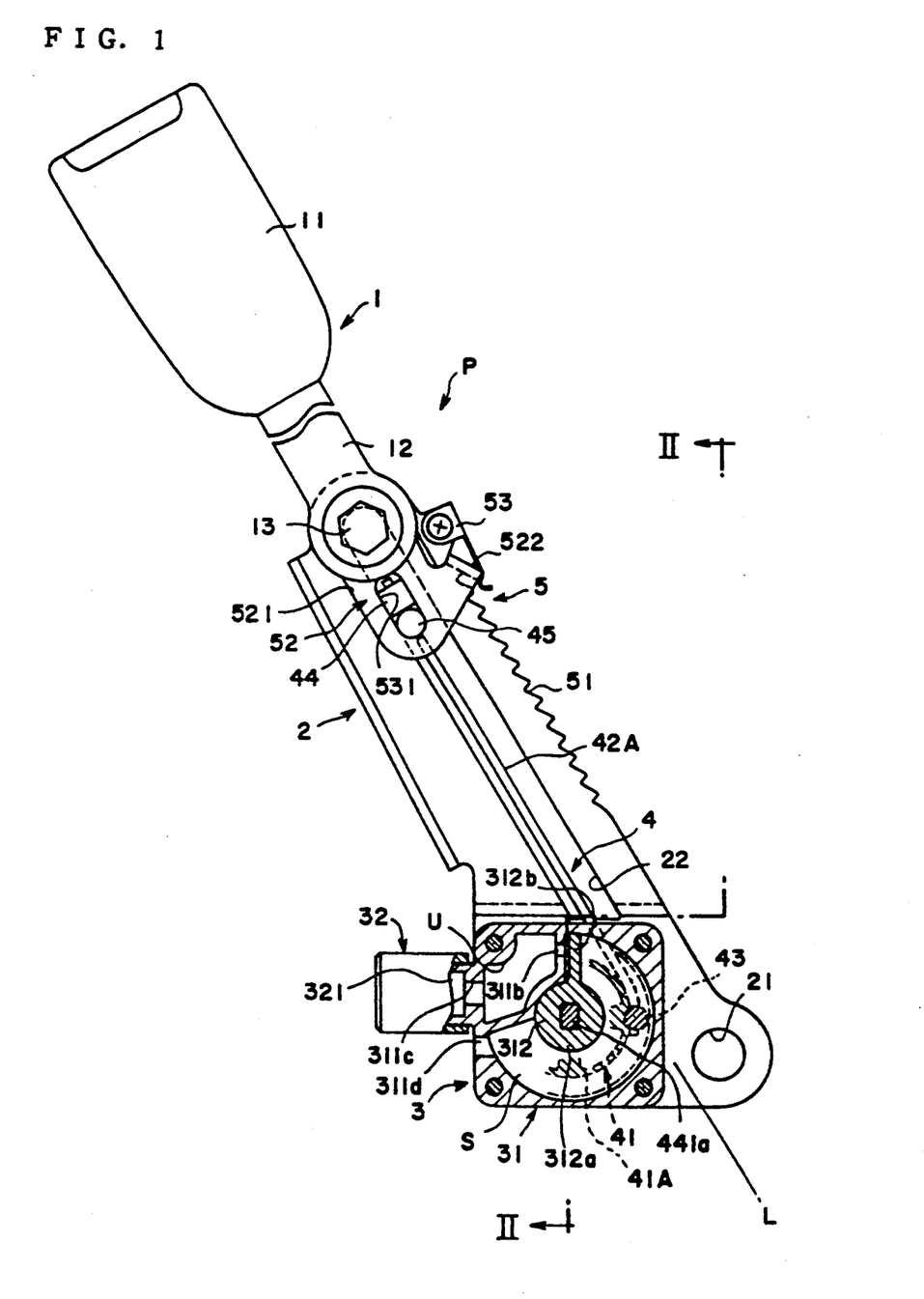
FIG. 1 is a side elevational view of a first embodiment of the present invention with a partial cross-sectional view of some components.
Figure 2:
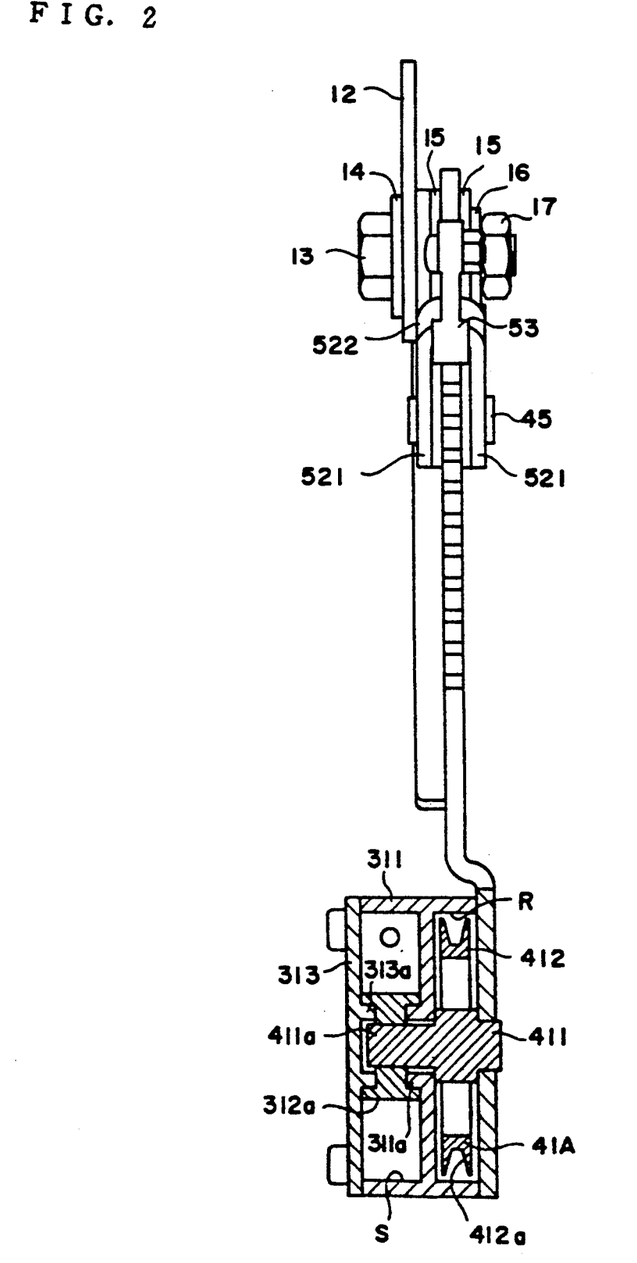
FIG. 2 is a broken cross-sectional view taken along the line II—II of FIG. 1.
Figure 3:
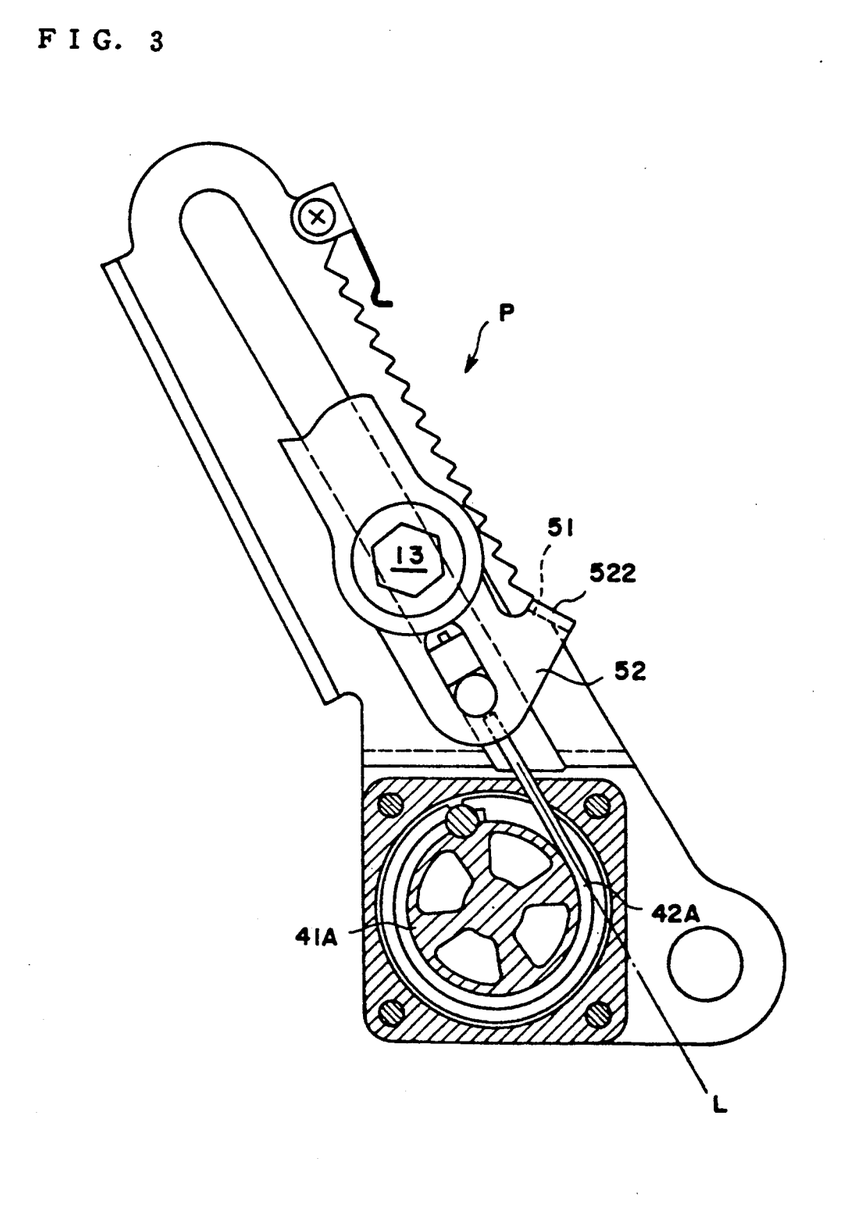
FIG. 3 is a side view similar to FIG. 1, showing the first embodiment with the buckle pulled down.

In the first embodiment, shown in FIGS. 1 to 3, a pretensioner P comprises a buckle 1, a support member 2 for supporting the buckle so that it can be pulled down, driving means 3 supported by the support member 2 and pulling down the buckle 1, connecting means 4 for connecting the buckle 1 with the driving means 3, and a locking mechanism 5 extending over the buckle support member 2 and the buckle 1 and for blocking return movement of the buckle 1. The driving means 3 comprises a rotary actuator 31 and a gas generator 32 for supplying operating gas. The connecting means 4 comprises a force transmitting mechanism 41 for transmitting a tangential component of the rotational force output of the rotary actuator 31 to the buckle 1 as a translational force that pulls down the buckle 1 from an upper position (FIG. 1) to a lower position (FIG. 3). In the embodiment, the force transmitting mechanism 41 is axially fixed to the rotary actuator 31 and includes a pulley 41A located so that the line L along which the buckle moves from the upper position to the lower position upon operation of the pretensioner is tangent to the pulley. One end of a wire rope 42A is affixed to the pulley by a pin 43.

The buckle 1 comprises a buckle main unit 11 having a latch mechanism that releasably engages a buckle tongue (not shown) and is enclosed within a cover and a buckle base 12 in the form of a plate extending from the frame of the latch mechanism downwardly through an opening in the cover. The lower end of the buckle base 12 is supported on the support member 2 by a bolt 13 inserted into a bolt hole at the lower end of the base and is mounted on the support so that it can be pulled down, as described below.

The support member 2 is elongated and has a bolt hole 21 at its lower end for a bolt (not shown) by which it is mounted on the side of the seat of the vehicle and an elongated, straight slot 22 that extends over most of the length of the support member in a longitudinal direction, except for the mounting portion of the driving means 3 adjacent to the hole 21. The slot 22 serves as a guide to support the buckle 1 so that it can be pulled down, and the shank of the bolt 13 passes through the slot 22.

The driving means 3 for pulling down the buckle 1 comprises a rotary actuator 31 mounted on the lower lateral side of the support member 2. As is evident from FIG. 2, the rotary actuator 31 comprises a cylinder block 311 of prismatic shape, a rotary piston 312, and a lid 313 that covers the open side of the cylinder block 311. The cylinder block 311 has a cylinder chamber S and a pulley-receiving chamber R, which are separated from each other by a partition wall. At or near the center of the partition wall in the radial direction is a hole for a shaft (described below), and an annular collar 311a projects into the cylinder chamber S and surrounds the hole. As shown in FIG. 1, the cylinder chamber S is a major segment of an annular cylindrical space within the block, and a gas supply chamber U is the remaining, minor segment of the space. The supply chamber U and the cylinder chamber S are communicated with each other by a gas inlet 311b. The supply chamber U is communicated with a gas generation chamber 321 of a gas generator 32 through an opening 311c in the side wall of the cylinder block 311. The cylinder chamber S is opened to the atmospheric air through an exhaust hole 311d. The cylinder block 311, together with the lid 313, is fixed at its four corners to the support member 2 by screws. An annular collar 313a protrudes from the inner surface of the lid 313 and is located coaxially with the annular collar 311a on the block. The rotary piston 312 includes a hub portion 312a serving as a rotation support for the piston and a vane portion 312b extending from the hub portion 312a in the radial direction. A rectangular hole is formed at the center of the hub portion 312a, and a cylindrical is located on each side face of the hub portion. The peripheral surface of each recess is rotatably supported by one of the two annular collars 311a and 313a.

The connecting means 4 of the embodiment includes a pulley 41A, a wire rope 42A and a pawl 52, the pawl also serving as a component of the locking mechanism 5. The pulley 41A has a shaft 411 and a flange 412, which has a groove 412a to receive the wire rope 42A on its outer periphery. A rectangular portion 411a of the shaft 411 extends into the cylinder chamber through the hole in the partition wall. One end of the shaft 411 is directly supported for rotation on the support member 2, and the rectangular portion 411a is engaged in a rectangular hole at the center of the hub portion 312a of the rotary piston 312 and is, accordingly, indirectly supported on the support member 2 for rotation by the rotary piston 312, the cylinder block 311 and the lid 313. The wire rope 42A has an end thereof affixed to a flange portion 412 of the pulley 41A by a stop pin 43, which is crimped on said end. The wire rope leads from the pulley into the slot 22 of the support member 2 through a guide hole in the cylinder block 311, extends along the slot 22, enters into the pawl 52, passes through a transverse hole in a connecting pin 45, and terminates immediately behind an end block 44 that is crimped onto its end.

The locking mechanism 5 comprises a series of ratchet teeth 51 provided on one lateral edge of the support member 2, and a pawl 52, which is engaged with or disengaged from the teeth. The pawl 52 is in the form of a saddle that straddles the support member and has leg portions 521 that extend over the slot 22 of the support member 2, one on each side of the support member, and a tooth-engaging portion 522 extending between the leg portions over the lateral edge where the teeth 51 are located. Each of the two leg portions 521 has an elongated hole 531 that is aligned with the slot 22 and also has a bolt hole. A bearing plate 15, made of synthetic resin, is received between the inner surface of each of the leg portions 521 and the respective side of the support member 2. The shank of the bolt 13 passes through a flat washer 14, a hole in the buckle base 12, a bolt hole in one of the leg portions 521 of the pawl 52, the elongated hole of one of the bearing plates 15 and through the slot 22 of the support member 2 and extends beyond the other side of the support member 2. Next, it passes through an elongated hole of the other bearing plate and reaches a notch on the other leg portion 521. A flat washer 16 is received on the end of the shank of the bolt 13, and a nut 17 is screwed onto the end of the bolt. In this way, the buckle base 12 and the pawl 52 are connected with each other so that they can rotate relative to each other and are supported so that they can be moved along the slot 22 of the support member 2. The connecting pin 45 and the end block 44 are engaged in the elongated hole 531, and the connecting pin 45 is engaged on the lower end of the elongated hole 531. A retaining spring 53 attached by a screw near the upper end side of the support member 2 releasably blocks downward movement of the buckle 1 by making the pawl 52 engage with a tooth 51 when the buckle is in its normal, upper position.

Normally, the pretensioner P is in the "set" or normal condition shown in FIG. 1. When an acceleration higher than a predetermined value acts on the vehicle and is detected by a sensor (not shown), which is mounted at an appropriate position in the vehicle, the gas generator 32 is operated by an electrical signal from the sensor, and gas generated by the generator is supplied to the supply chamber U through the opening 311c. Filling the preliminary chamber U to a predetermined pressure, the gas is injected into a pressurizing compartment of the cylinder chamber S through the gas inlet 311b. The gas pressure delivered into the pressurizing compartment is applied on the vane 312b. As a result, the rotary piston 312 is rotated clockwise, relative to the figure. Compression of the air in the back pressure chamber, which opposes the operation of the actuator, is vented as exhaust air from the exhaust hole 311d. The rotation of the rotary piston 312 is transmitted to the pulley 41A through the rectangular shaft portion 411a, and the wire rope 42A wound in the groove 412a of the flange 412 is pulled in a direction tangentially of the pulley 41A. This tangential force is transmitted from the wire rope 42A through the end block 44 and the connecting pin 45 to the pawl 52, and it is further transmitted to the buckle main unit 11 through the bolt 13 and the buckle base 12. Thus, the rotational driving force of the rotary actuator 3 is completely converted or transduced to a translational driving force by the pulley 41A and the wire rope 42A in the axial direction L to pull down the buckle 1, i.e., in the tangential direction with respect to the pulley 41A, and this minimizes the loss of the driving force.

Because the shaft portion of the bolt 13 is guided along the slot 22 of the supported member 2 during the operation of the pretensioner, the buckle 1 connected to it is also pulled down along the slot 22. Because the pawl 52 can rotate around the shaft of the bolt 13 as it is pulled down along the axial line L, it moves over the ratchet teeth 51, even though it receives a force in the direction of the axial line L. As the buckle is pulled down, the wire rope 42A is wound around the groove 412a of the pulley 41A. When the buckle reaches the lower position, as shown in FIG. 3, the rotary piston 312 reaches the limit of the rotating stroke and stops. Gas pressure in the pressurizing chamber is discharged through the exhaust hole 311d, and the pull-down operation of the pretensioner is completed. The enqaqinq portion 522 of the pawl 52 engages with the appropriate ratchet tooth at the lower position. When the buckle is pulled down, the buckle tongue (not shown) of the seat belt latched to the buckle is also pulled down, and tension is imparted to the belt.

After the pretensioning operation, the buckle 1 receives a force in the upward direction as the body of the occupant is moved forward by an inertial force. This force tries to pull the pawl 52 up via the bolt 13, but the upward movement is blocked by the engagement of the engaging portion 522 with a ratchet tooth 51. Therefore, the release of the tension in the belt is prevented.

In the pretensioner of the present embodiment, the connecting means 4 comprises the pulley 41A and the wire rope 42A wound onto the pulley. Thus, it is advantageous in that no space is required to receive the buckle in the lower portion of the pretensioner P.

The second embodiment shown in FIGS. 4 to 7 is essentially the same as the first embodiment above, but it is different from the latter in the arrangement of the connecting means 4 and the force transmitting mechanism 41. In the second embodiment, the force transmitting mechanism 41 comprises a pinion 41B and a rack 42B. The rack 42B has a number of rack teeth 421B formed on one side edge of a buckle base 12B and is integrated with the buckle base 12B. A rectangular shaft 411Ba of a pinion 41B engaged with the rack teeth 421B is inserted into and connected with a rotary piston 312. On the other side edge of the buckle base 12B are a series of ratchet teeth 51B. A pawl 52B engaged with or disengaged from the ratchet teeth 51B is rotatably supported on a support member 2B and is pushed in a direction such as to engage a ratchet tooth by a spring 54, which is attached to the support member 2B by a screw.

Figure 4:
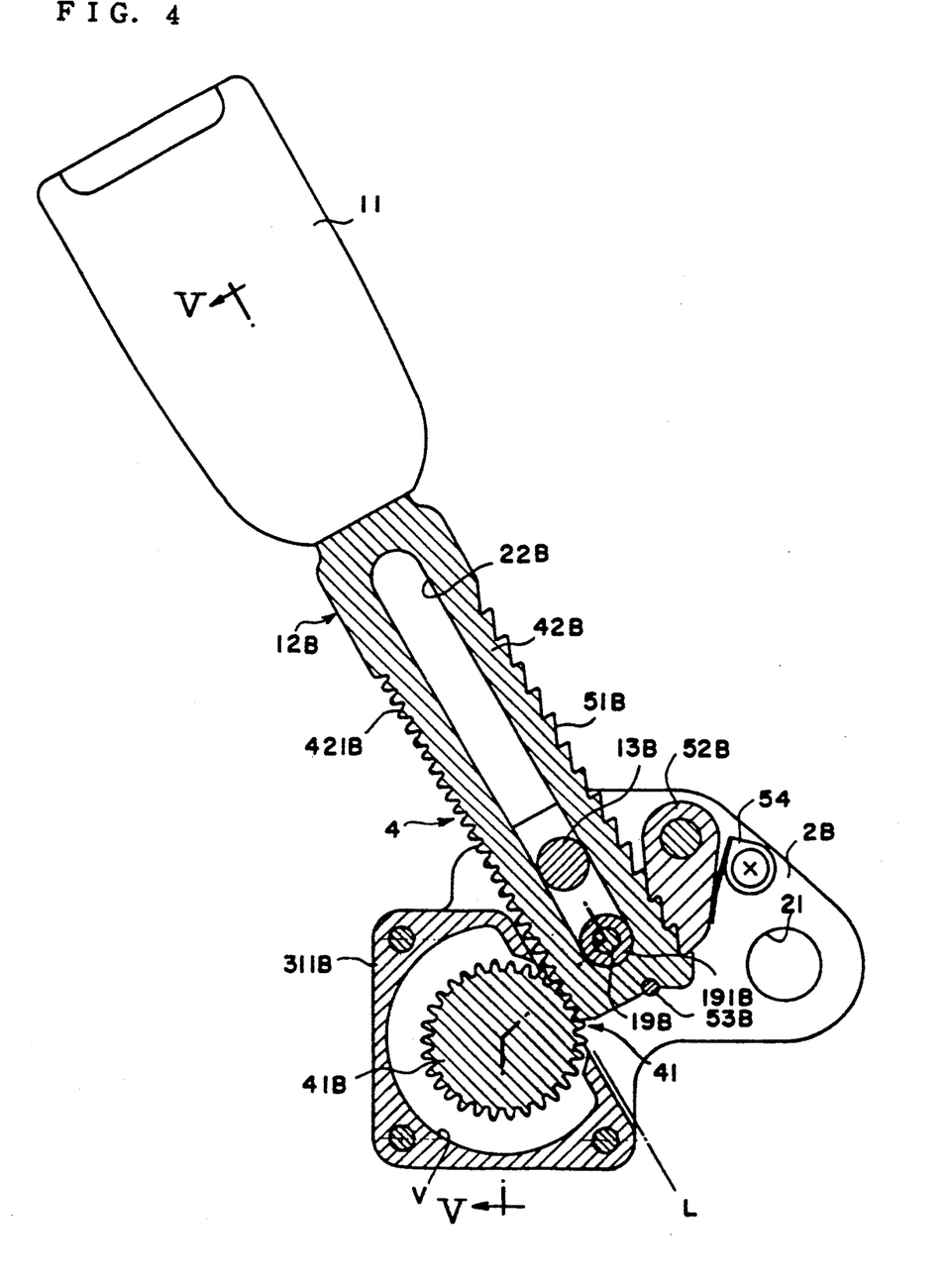
FIG. 4 is a side elevational view of a second embodiment of the present invention with a partial cross-sectional view of some components.
Figure 5:
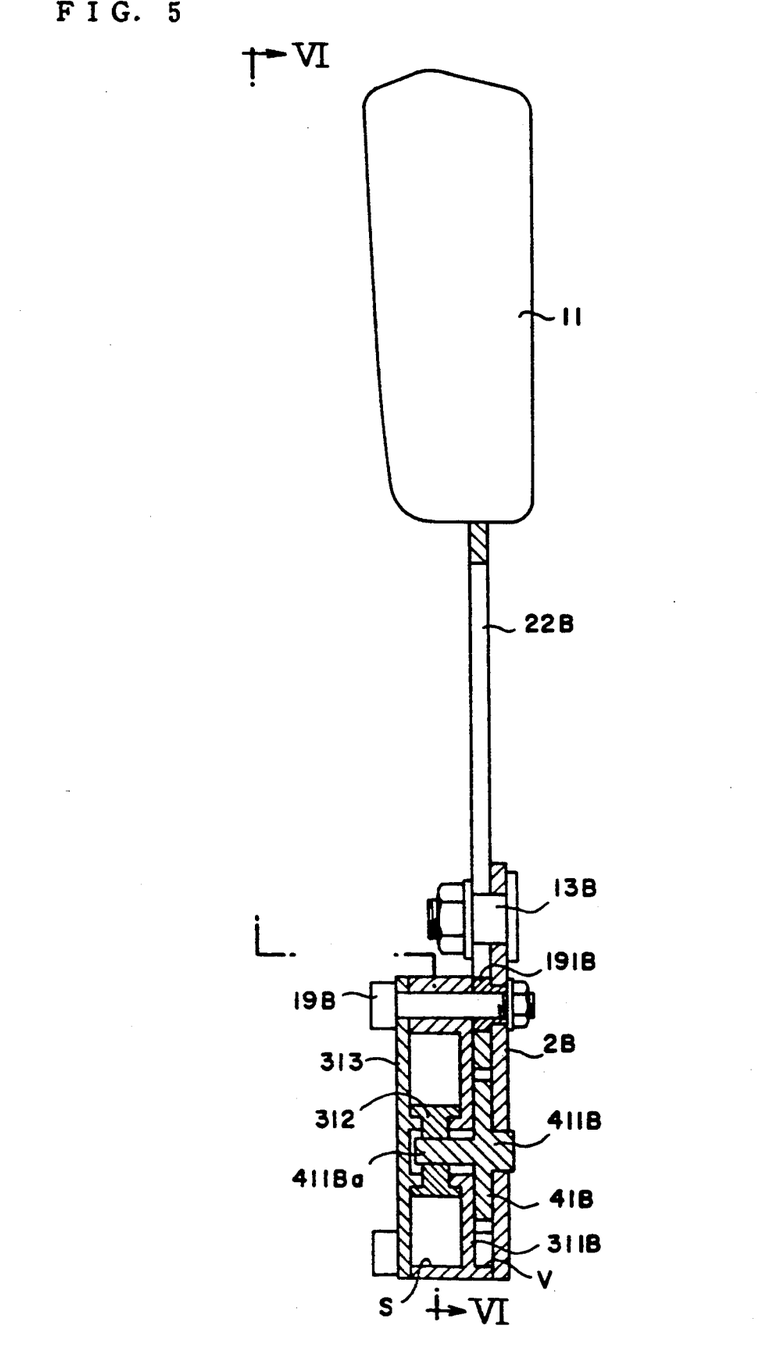
FIG. 5 is a cross-sectional view taken along the line V—V of FIG. 4.

In this embodiment, the supporting relationship between the support member 2B and the buckle base 12B is the reverse of that of the first embodiment, and a pair of guide pins 13B and 19B are provided on the support member 2B. A slot 22B to receive the two pins 13B and 19B is formed on the buckle base 12B. The slot 22B extends almost over the entire length of the buckle base 12B. One guide pin 13B is inserted into a pin hole of the support member 2B and is retained by a fall-stop nut, while the other guide pin 19B comprises a stepped sleeve 191B engaged with the shaft portion of a bolt, which affixes a cylinder block 311B and a lid 313 of the rotary actuator 31 to the support member 2B. The sleeve 191B also serves as a spacer to maintain axial width of a pinion-receiving chamber V at a predetermined value.

Figure 6:
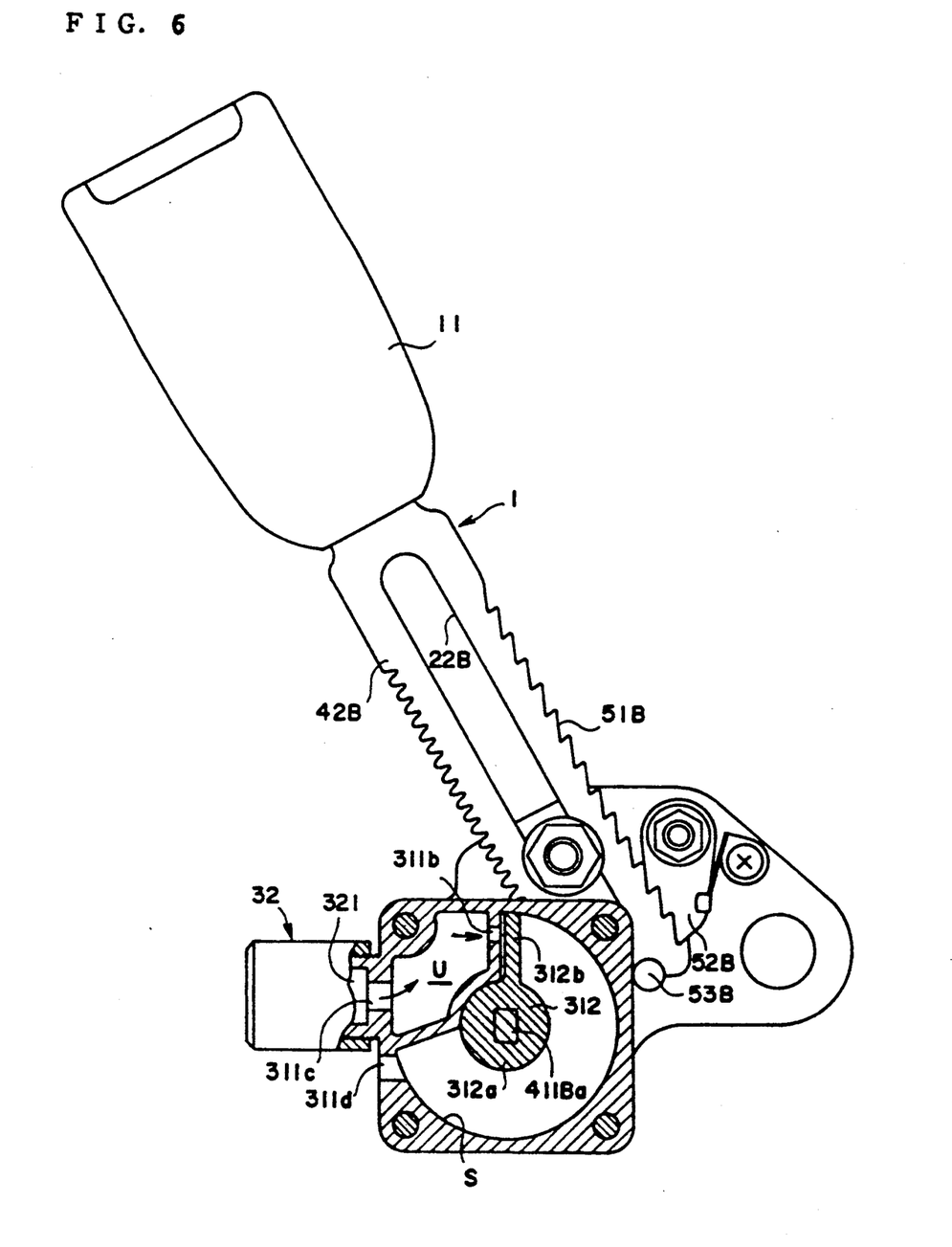
FIG. 6 is a cross-sectional view taken along the line VI—VI of FIG. 5.

The arrangement of the second embodiment, other than as just described, is the same as the first embodiment. The corresponding components are designated by the same reference symbols, and a detailed description is not needed or provided here. The reference numeral 53B in FIG. 4 and FIG. 6 represents a shear pin, which functionally corresponds to the spring 53 in the first embodiment and fulfills the same function, that of holding the buckle 1 set to a predetermined normal upper position. The shear pin breaks when the pretensioner is operated, and the buckle 1 can be pulled down.

In the second embodiment, when the rotary piston 312 is rotated, the engaging position of the rack teeth 421B engaged with the pinion 41B is changed when the pinion 41B is rotated, and the rack, i.e., the buckle base 12B, is pulled down. As it is pulled down, the buckle base 12B is guided by the two guide pins 13B and 19B along the slot 22B and maintains smooth engagement between the rack 42B and the pinion 41B. Meanwhile, the pawl 52B rotates outwardly against the force of the spring 54 so that the ratchet teeth 51B can pass by it as the base 12B moves downwardly.

Figure 7:
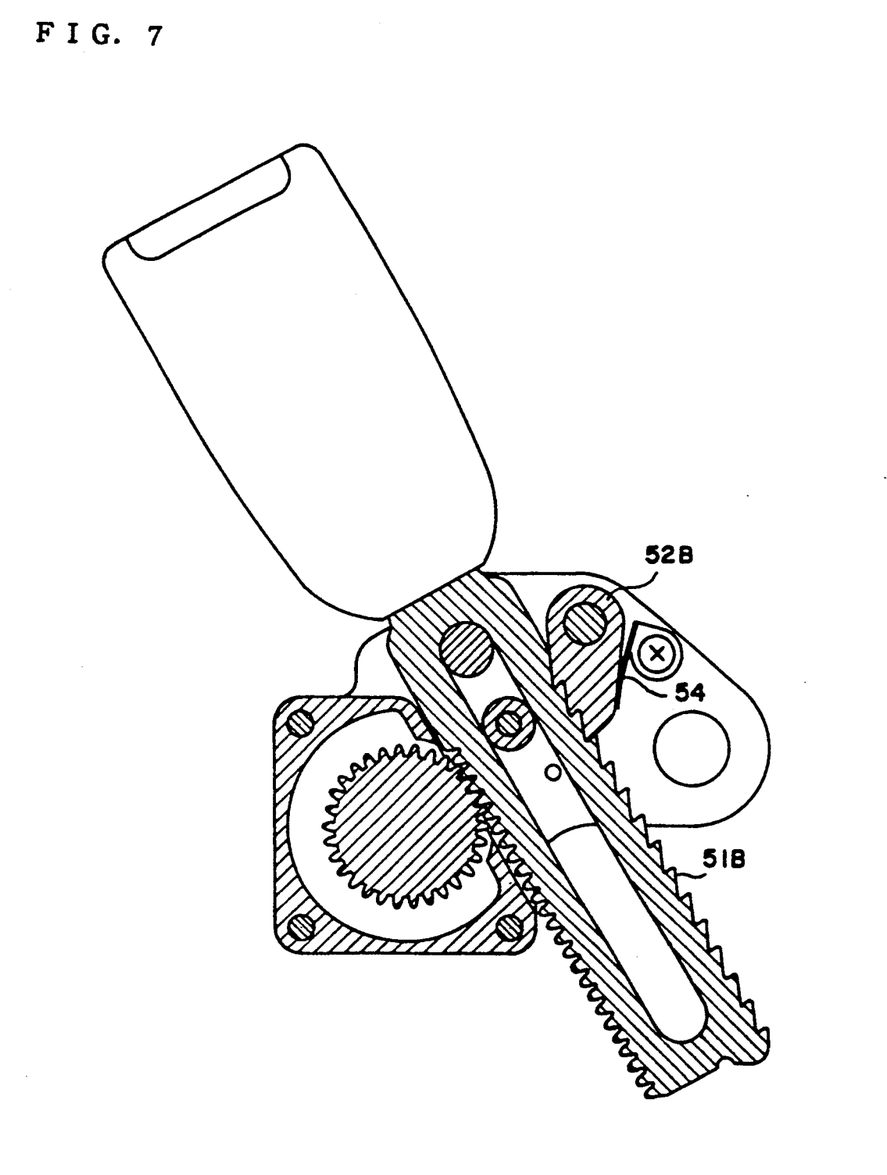
FIG. 7 is a side view similar to FIG. 4, showing the second embodiment with the buckle pulled down.

After the buckle 1 reaches the lower position shown in FIG. 7, the pawl 52B becomes engaged under the force of the spring 54 with a ratchet tooth 51B, thereby locking the buckle in the lower position.

The above-described embodiments of the invention ar intended to be merely exemplary, and numerous variations and modifications of the embodiments will be apparent to those skilled in the art without departing from the spirit and scope of the invention. All such variations and modifications are intended to be within the scope of the invention, as defined in the appended claims.

We claim:

1. A buckle pretensioner for a seat belt system having a support member on which a buckle is mounted for movement generally downwardly from a normal upper position to a pretensioning lower position, driving means mounted on the support member for generating a driving force to move the buckle along the support member from the upper position to the lower position, connecting means connecting the driving means to the buckle for transmitting the driving force from the driving means to the buckle, and locking means for locking the buckle in the lower position to which it is driven by the driving force, characterized in that the driving means includes a rotary actuator having a rotor, and a gas generator for supplying operating gas to the rotary actuator, and in that the coupling means is a force-transmitting mechanism that transduces a tangential force produced by rotation of the rotor to a translational force for moving the buckle from the upper position to the lower position.

* * * * *